(12) United States Patent
Cooper et al.

(10) Patent No.: US 9,774,929 B2
(45) Date of Patent: Sep. 26, 2017

(54) INFRARED PROXIMITY SENSOR CONTROL OF DEVICES

(71) Applicant: Itron, Inc., Liberty Lake, WA (US)

(72) Inventors: Robert L. Cooper, Spokane, WA (US); Alex Cory, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 60 days.

(21) Appl. No.: 14/492,591

(22) Filed: Sep. 22, 2014

(65) Prior Publication Data

US 2016/0088371 A1   Mar. 24, 2016

(51) Int. Cl.
| | | |
|---|---|---|
| *H04Q 9/00* | (2006.01) | |
| *G08C 23/04* | (2006.01) | |
| *H04M 1/02* | (2006.01) | |
| *H04M 1/18* | (2006.01) | |
| *H04M 1/725* | (2006.01) | |

(52) U.S. Cl.
CPC .............. *H04Q 9/00* (2013.01); *G08C 23/04* (2013.01); *H04M 1/0202* (2013.01); *H04M 1/18* (2013.01); *H04M 1/72522* (2013.01); *H04M 2250/12* (2013.01); *H04Q 2209/40* (2013.01); *H04Q 2209/60* (2013.01)

(58) Field of Classification Search
CPC .. H04Q 9/00; H04Q 2209/60; H04Q 2209/40; G08C 23/04; G01D 4/00; H04M 1/0202; H04M 1/18; H04M 1/72522; H04M 2250/12
USPC .................................................... 340/870.28
See application file for complete search history.

(56) References Cited

U.S. PATENT DOCUMENTS

| | | | |
|---|---|---|---|
| 6,044,632 A | 4/2000 | Schmalz et al. | |
| 9,582,078 B1* | 2/2017 | Veygman | G06F 3/017 |
| 2010/0149113 A1* | 6/2010 | Hansson | G06F 1/3231 |
| | | | 345/173 |
| 2013/0077215 A1* | 3/2013 | Tada | G06K 9/00006 |
| | | | 361/679.01 |
| 2013/0297251 A1* | 11/2013 | Engel-Hall | G01B 21/16 |
| | | | 702/150 |
| 2014/0087792 A1 | 3/2014 | Park | |
| 2014/0362051 A1* | 12/2014 | Gomez | G06F 3/042 |
| | | | 345/175 |
| 2015/0072789 A1* | 3/2015 | Heubel | G06F 3/016 |
| | | | 463/37 |

(Continued)

FOREIGN PATENT DOCUMENTS

EP         2573710         3/2013

OTHER PUBLICATIONS

Itron, Inc., "900 MHz Belt Clip Radio," Specifications, Jun. 2014, 2 pages.

(Continued)

*Primary Examiner* — Hirdepal Singh
(74) *Attorney, Agent, or Firm* — Hanley, Flight & Zimmerman, LLC

(57) ABSTRACT

Infrared proximity sensor control of devices is described herein. One disclosed example apparatus includes an infrared proximity detection sensor disposed within a substantially environmentally-isolated zone of an electronic device, where the infrared proximity detection sensor is to detect an input sequence, and a processor to receive the input sequence, where the processor is programmed to interpret a command by comparing a defined sequence to the input sequence.

23 Claims, 7 Drawing Sheets

(56) References Cited

U.S. PATENT DOCUMENTS

| | | | | |
|---|---|---|---|---|
| 2015/0177865 A1* | 6/2015 | Rodzevski | ............. | G06F 3/042 345/175 |
| 2015/0192438 A1* | 7/2015 | Choi | ..................... | G01D 11/26 73/431 |
| 2015/0200444 A1* | 7/2015 | Mercer | ................. | H01B 19/00 343/702 |
| 2017/0090003 A1* | 3/2017 | Guo | ....................... | G01R 35/00 |

OTHER PUBLICATIONS

International Searching Authority, "International Search Report", issued in connection with PCT Application No. PCT/US2015/049918, mailed on Dec. 22, 2015, 5 pages.

International Searching Authority, "Written Opinion", issued in connection with PCT Application No. PCT/US2015/049918, mailed on Dec. 22, 2015, 6 pages.

International Bureau, "International Preliminary Report on Patentability," issued in connection with International application No. PCT/US2015/049918, mailed Apr. 6, 2017 (8 pages).

\* cited by examiner

INFRARED PROXIMITY SENSOR CONTROL OF DEVICES

FIELD OF THE DISCLOSURE

This patent relates generally to control of devices and, more particularly, to infrared proximity sensor control of devices.

BACKGROUND

Some portable electronic devices are used and/or placed in harsh environmental conditions. In particular, portable utility metering communication devices may be used in the field (e.g., outdoors) to communicate with and/or program wireless endpoints, which are typically integrated or in communication with utility meters of an automatic meter reading (AMR) collection system. Utility providers typically use the portable utility metering communication devices to install, control, maintain and/or collect utility usage data from the endpoints. The portable utility metering communication devices also enable and/or facilitate communication between the endpoints and other portable devices for diagnostics, data transfers, etc.

Typically, because the portable utility metering communication devices are used outdoors, they are exposed to harsh environmental conditions (moisture, liquids, extreme temperatures, heavy winds, impact(s), etc.). Operation of the portable utility metering communication devices often requires input via a tactile button, which may be environmentally-sealed to withstand harsh environmental conditions. Environmentally-sealed tactile buttons may pose significant expense and/or complex design implementations such as design features in parts and extraneous components to environmentally isolate and/or attach or mount the buttons, etc.

Figure 1:
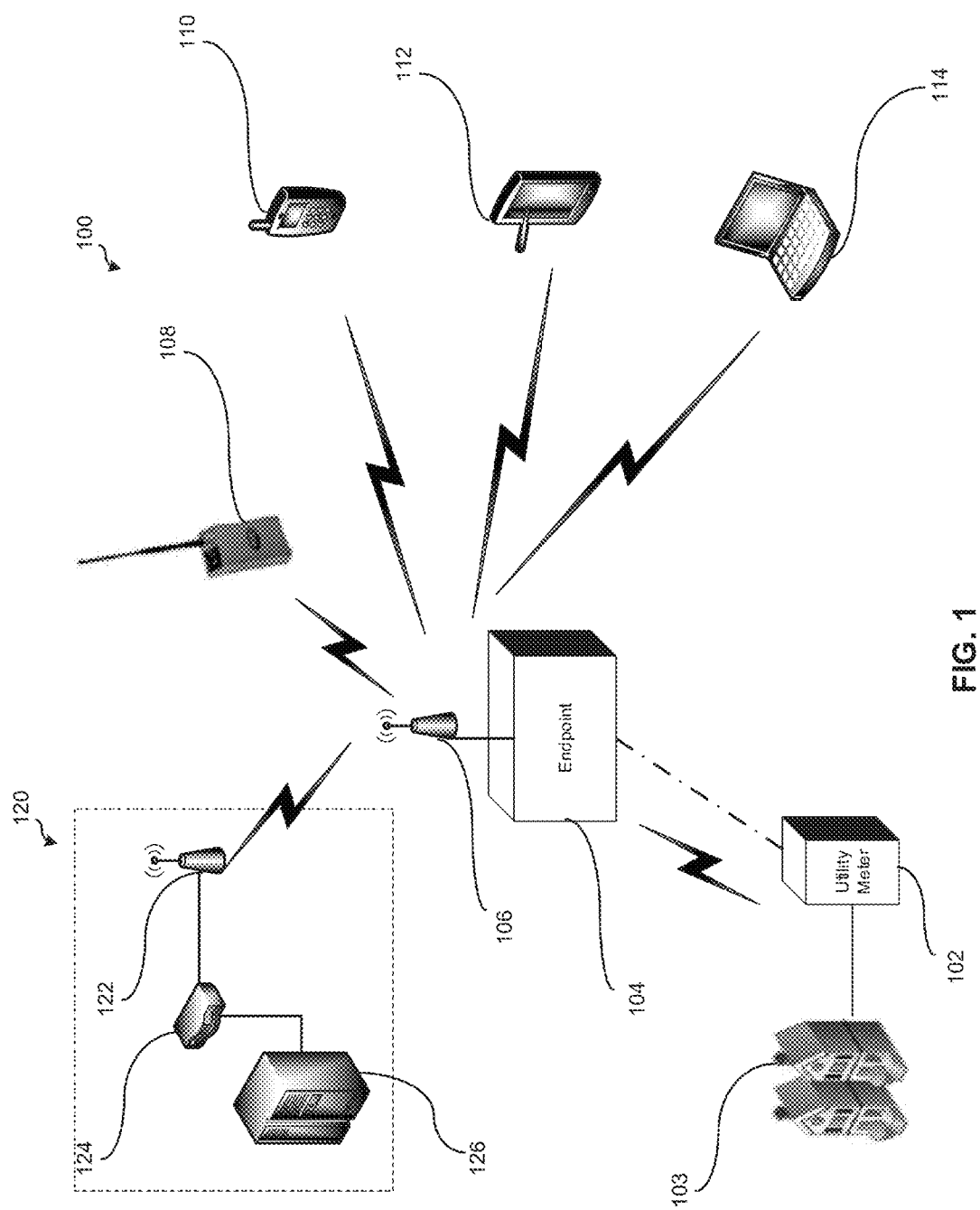
FIG. 1 illustrates an example data communication system in which the examples disclosed herein may be used.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

An example apparatus includes an infrared proximity detection sensor disposed within a substantially environmentally-isolated zone of an electronic device, where the infrared proximity detection sensor is to detect an input sequence, and a processor to receive the input sequence, where the processor is programmed to interpret a command by comparing a defined sequence to the input sequence.

An example method includes detecting, by one or more infrared proximity detection sensors disposed within a substantially environmentally-isolated zone of a portable device, an input sequence, receiving, by a processor, the input sequence, verifying, at the processor, that the input sequence falls within a defined criteria, and interpreting a command, at the processor, based on the verification of the input sequence.

Another example apparatus includes a first infrared proximity detection sensor disposed within a substantially environmentally-isolated zone of a portable electronic device for use with utility communication systems, a second infrared proximity detection sensor disposed within the substantially environmentally-isolated zone, and a processor disposed within the substantially environmentally-isolated zone, where the processor is to perform an action upon successfully comparing an input sequence comprising input detected at the first and second infrared proximity detection sensors to a defined sequence.

Infrared proximity sensor control of devices is disclosed herein. Typically, electronic devices (e.g., portable electronic devices) that are subject to harsh environmental conditions utilize buttons and/or actuation switches that are environmentally-isolated (e.g., environmentally-sealed, etc.). Often these environmentally-isolated buttons and/or switches require significant cost and/or part complexity. In particular, the environmentally-isolated buttons and/or switches may require numerous parts (e.g., gaskets, O-rings, etc.) and/or design features to mount and/or environmentally isolate the buttons and/or switches. Additionally, environmentally-isolated buttons or switches typically have wear issues (e.g., limited life) and/or reduced actuation cycles to failure, both of which may be caused by their environmental robustness.

The examples disclosed herein may be used to reduce (e.g., eliminate) the need for expensive environmentally-sealed buttons and/or interfaces for substantially environmentally-isolated (e.g., environmentally-sealed) portable devices. The examples disclosed herein utilize one or more infrared proximity sensors (e.g., infrared proximity detection sensors) to accept and/or detect inputs (e.g., input signals) from a user or any other appropriate input source including, but not limited to, another device or object. In some examples, an input sequence defined by one or more inputs may be entered via an infrared proximity sensor to cause a processor, which may be disposed within an environmentally-isolated zone of the device, to perform a command (e.g., communicate with and/or command another device). The examples disclosed herein allow infrared proximity sensor(s) to be positioned within (e.g., disposed within) a substantially environmentally-isolated zone and detect commands via a translucent window of a housing, for example.

In some examples, overlapping input signals and/or pulses detected from more than one infrared proximity sensor are used by a processor to interpret a command. In some examples, an initialization command sequence received by one or more proximity sensors is received and/or verified by the processor, for example, to initialize the device to receive a command sequence (e.g., an input sequence). In some examples, an accepted and/or verified command sequence from one or more infrared proximity sensors enables communication between a first electronic device and a second electronic device. In some examples, input sequences are verified with respective patterns (e.g., expected detection patterns, defined patterns, expected input sequences, etc.) and/or time tolerance bands by the processor.

As used in the examples disclosed herein, the term "infrared proximity sensor" refers to an infrared sensor used to detect objects within a defined proximity of the sensor. As used in the examples disclosed herein, the terms "environmentally-isolated" or "substantially environmentally-isolated" refers to an enclosure, zone and/or volume that is substantially resistant to fluids, fluid pressure, particles, etc. The terms "environmentally-isolated" or "substantially environmentally-isolated" may refer to an isolation standard such as an IP65, IP67 or IP68 certified enclosure, etc., for example. As used herein, the term "input" may refer to user input, input from another device, sensor output (e.g., transduced output, transduced input signals, voltage, pulses, etc.) and/or any other appropriate means for providing input to a device. For example, "input" may refer to an object causing detection signals at an infrared proximity sensor.

FIG. 1 illustrates an example utility data communication system 100 in which the examples disclosed herein may be implemented. For example, the utility data communication system 100 is used to collect utility usage data (e.g., utility consumption data, etc.) from endpoints of an automatic meter reading (AMR) collection system. The utility data communication system 100 of the illustrated example includes a utility meter 102 that measures utility usage data of home(s) 103 and is communicatively coupled to an endpoint 104 that, in turn, communicates the utility usage data via a radio (e.g., a transmitter/receiver, omnidirectional and/or unidirectional antenna(s), etc.) 106. In this example, the utility data communication system 100 also includes a communication radio 108, a mobile phone (e.g., a smart phone) 110, a tablet 112, and a laptop 114, all of which are in wireless communication with the endpoint 104 via the radio 106. The utility data communication system 100 of the illustrated example includes a data collection system 120 to receive the utility usage data and may store the utility usage data, for example. The data collection system 120 of the illustrated example includes a radio (e.g., a radio receiver, transmitter/receiver, etc.) 122, a network 124 (e.g., network hardware, routers, servers, gateways, etc.), and a data storage (e.g., data servers, storage devices, etc.) 126.

In this example, the endpoint utility meter 102 measures and/or receives utility usage data of the home(s) 103. The utility usage data is then transmitted and/or communicated to the endpoint 104. In turn, the endpoint 104 transmits the utility usage data to the data collection system 120 via the radio 106. The endpoint 104 may transmit the utility usage data at regularly defined intervals (e.g., periodically) or when a certain condition has been met (e.g., utility usage data value(s) and/or an amount of the utility usage data exceeds a threshold, etc.). In some examples, the endpoint 104 collects the utility usage data from numerous utility meters. The endpoint 104 may utilize software (e.g., encoders/decoders, communication buffers, etc.) to process (e.g., compress, encode, encrypt, etc.) the utility usage data prior to or during communication with the data collection system 120. In some examples, the endpoint 104 validates and/or verifies utility usage data or transmission data prior to transmitting the utility usage data to the data collection system 120.

The data collection system 120 of the illustrated example receives the utility usage data from the endpoint 104 at the radio 122. In this example, the radio 122 communicates (e.g., transmits) the utility usage data to the network 124 to be collected and/or stored in the data storage 126. Additionally or alternatively, the data collection system 120 may request re-transmission of utility usage data from the endpoint 104 via transmission from the radio 122 when data from the endpoint 104 has not been received within an expected time period and/or data collected from the endpoint has an error, etc.

In this example, the communication radio 108 communicates wirelessly to the endpoint 104 via the radio 106 to issue commands and/or establish communication from the endpoint 104 to another device and/or the communication radio 108. For example, the communication radio 108 may be used to establish communication between the endpoint 104 and the mobile phone 110, the tablet 112 and/or the laptop 114. In particular, input commands placed on the communication radio 108 may enable wireless communication between the laptop 114 and the endpoint 104, for example, enable software on the laptop 114 to configure the endpoint 104, analyze the utility usage data received from the home(s) 103, use diagnostic software on the endpoint 104, configure the endpoint 104, and/or disable the endpoint 104, etc. Often, devices such as the communication radio 108 are subject to harsh environmental conditions due to outdoor use and may require substantially environmentally-isolated (e.g., sealed, etc.) enclosures.

Figure 2:
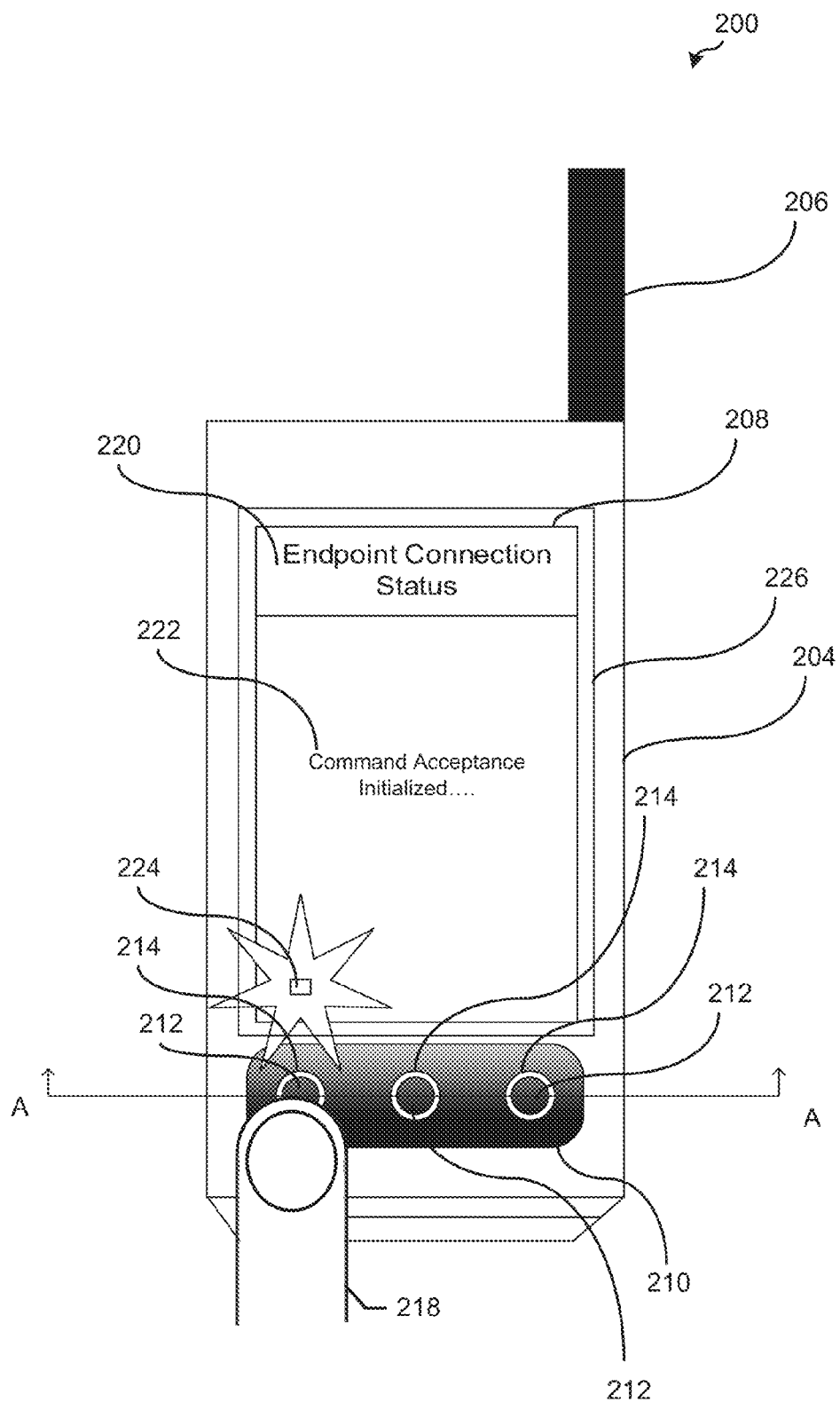
FIG. 2 illustrates an example device in accordance with the teachings of this disclosure.

As set forth herein, FIG. 2 illustrates an example device 200 in accordance with the teachings of this disclosure. Similar to the communication radio 108 described above in connection with FIG. 1, the example device 200 is used to communicate to a utility endpoint to command the utility endpoint and/or initiate communication between the endpoint and another device, for example. The device 200 of the illustrated example includes a housing 204, an antenna 206, a display (e.g., LCD, LED, OLED, etc.) 208, an input portion 210 of the housing 204 with infrared proximity sensor(s) 212 positioned and/or mounted behind window(s) (e.g., transparent windows, translucent material, etc.) 214.

In this example, the device 200 is substantially environmentally-isolated. In particular, the housing 204 and other components related to mounting and/or assembly of the device 200 has seals (e.g., sealing gaskets, compression gaskets, O-rings, etc.) and/or other isolating mechanisms, features or parts to substantially isolate the device 200 and/or inner portions of the device 200 from external conditions, thereby defining a substantially environmentally-isolated zone. For example, the input portion 210 may include a plastic component that is adjacent to a sealing gasket to substantially isolate an internal volume of the device 200.

In this example, the device 200 has three of the infrared proximity sensors 212. However, the device 200 may utilize one or any other appropriate number of the infrared proximity sensors 212. In this example, a finger 218 of a user triggers a detection at the first infrared proximity sensor 212 when the finger 218 is within a defined distance from the first proximity sensor 212. This detection may be a first input of a sequence of detection events (e.g., an input sequence) necessary for a command to be interpreted at a processor of the device 200 such as the processor 712 described below in connection with FIG. 7. In some examples, infrared emitters are used in conjunction with the infrared proximity sensors 212 to detect the finger 218, for example. In other words, the infrared emitters may illuminate the finger 218 as the finger 218 is being detected by one of the infrared proximity sensors 212, for example.

In some examples, the device 200 has the display 208 to convey an endpoint connection status 220, a status of a received command and/or input 222, and/or detection indicators 224 to indicate detection events at one or more of the infrared proximity sensors 212. In other examples, detection indication may occur by an LED positioned and/or mounted behind a translucent window mounted to the housing 204 or onto the housing 204 itself.

In this example, the display 208 of the illustrated example is positioned behind a window (e.g., transparent or translucent window, etc.) 226, which substantially isolates an internal portion of the device 200 from the external environment via a sealing gasket. In other examples, the device 200 does not have the display 208.

In this example, the infrared proximity sensor(s) 212 are positioned behind the translucent window(s) 214, which substantially isolate (e.g., seal) the internal volume, thereby allowing the sensor(s) 212 to detect objects such as the finger 218, which is within a defined proximity of the sensor(s) 212 and/or the window(s) 214. In some examples, the size and/or position of each of the windows 214 is dimensioned relative to each of the infrared proximity sensors 212 to define a characteristic distance at which input is detected (e.g., a threshold distance in which an object is within proximity of the infrared proximity sensor 212 to be detected by the infrared proximity sensor 212).

In some examples, the housing 204 and/or other components associated with mounting and/or assembling of the device 200 have structures and/or components to prevent the device 200 from being damaged during drop or impact (e.g., drop resistant, impact resistant, etc.). In particular, the housing 204 may have reinforcement ribs, for example, to prevent damage to any of the infrared sensors 212 and/or any of the related electronics or structure of the device 200. In other words, the device 200 may have a drop-damage resistant zone, which may overlap or partially overlap with the substantially environmentally-isolated zone of the device 200.

Figure 3:
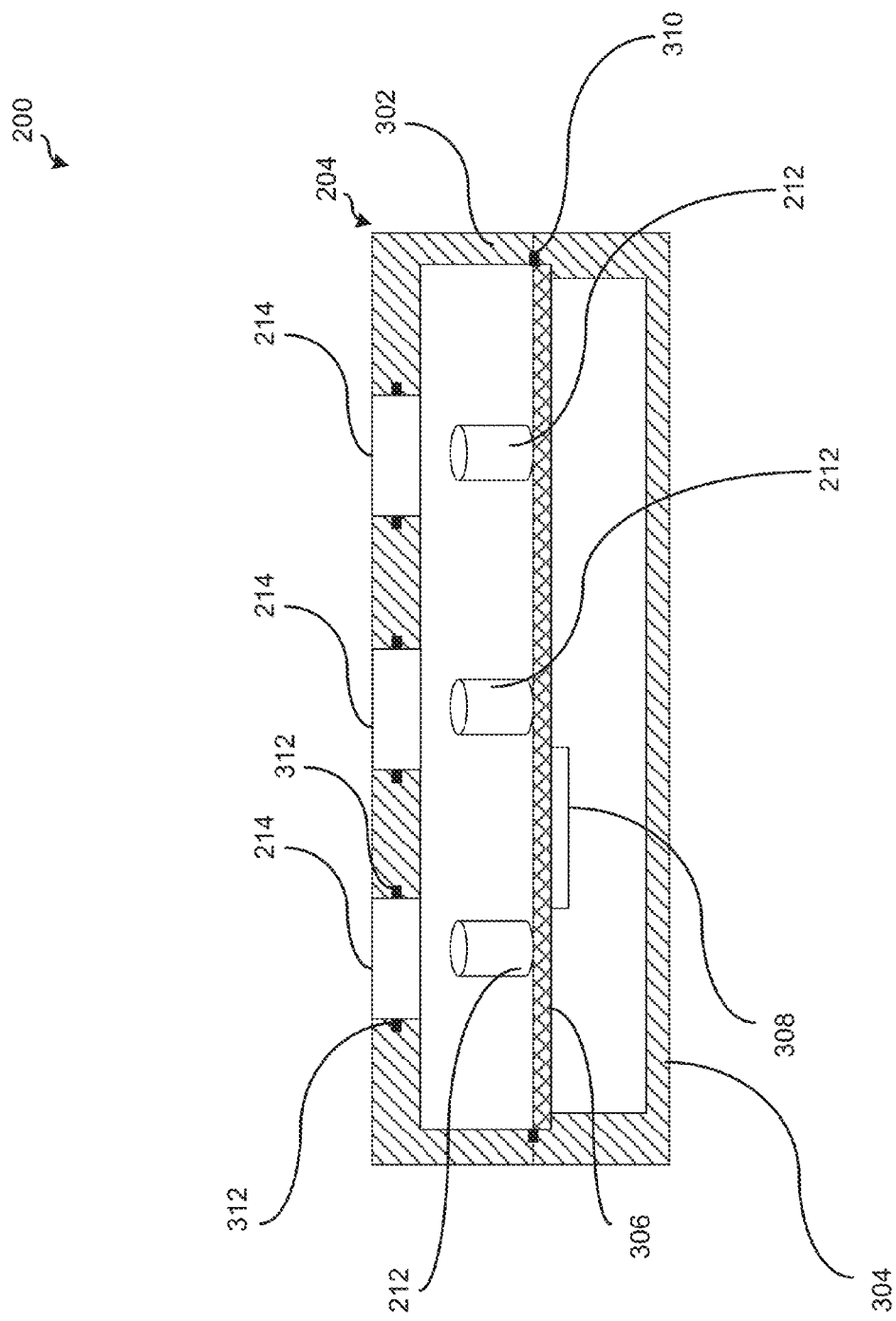
FIG. 3 is a cross-sectional view of the example device of FIG. 2.

FIG. 3 is a cross-sectional view along the line A-A of the example device 200 of FIG. 2. In this example, the housing 204 includes a front housing 302 and a rear housing 304. The rear housing 304 of the illustrated example mounts a printed circuit board (PCB) 306, onto which the infrared proximity sensors 212 are mounted (e.g., soldered to, board mounted, etc.). In this example, electrical components 308 (e.g., the processor 712) are mounted onto the PCB 306. In other examples, the proximity sensors 212 may be mounted to the front housing 302 and/or the rear housing 304 with wires attached to the proximity sensors 212 to communicatively couple the proximity sensors 212 to other hardware, for example. In some examples, walls and/or other structures may isolate the infrared proximity sensors from one another.

To maintain the substantially environmentally-isolated internal zone or volume of the device 200 described above in connection with FIG. 2, an interface between the front housing 302 and the rear housing 304 has seals (e.g., gaskets, compressible gaskets, O-rings, etc.) 310. Likewise, the windows 214 have respective seals 312 to substantially isolate the internal volume of the device 200 from external conditions.

In this example, the infrared proximity sensors 212 detect objects (e.g., a finger of a user, etc.) within a defined proximity such as 5 millimeters (mm), for example, of the infrared proximity sensors 212 and/or the windows 214. In particular, an object close to one of the windows 214 and/or one of the infrared proximity sensors 212 may, in response, trigger a voltage output of the infrared proximity sensor 212. These detections may comprise input and, thus, define input sequences, etc. In some examples, providing inputs detected at different infrared proximity sensors defines a sequence. Input and input sequences are discussed in greater detail below in connection with FIGS. 4 and 5.

Figure 4:
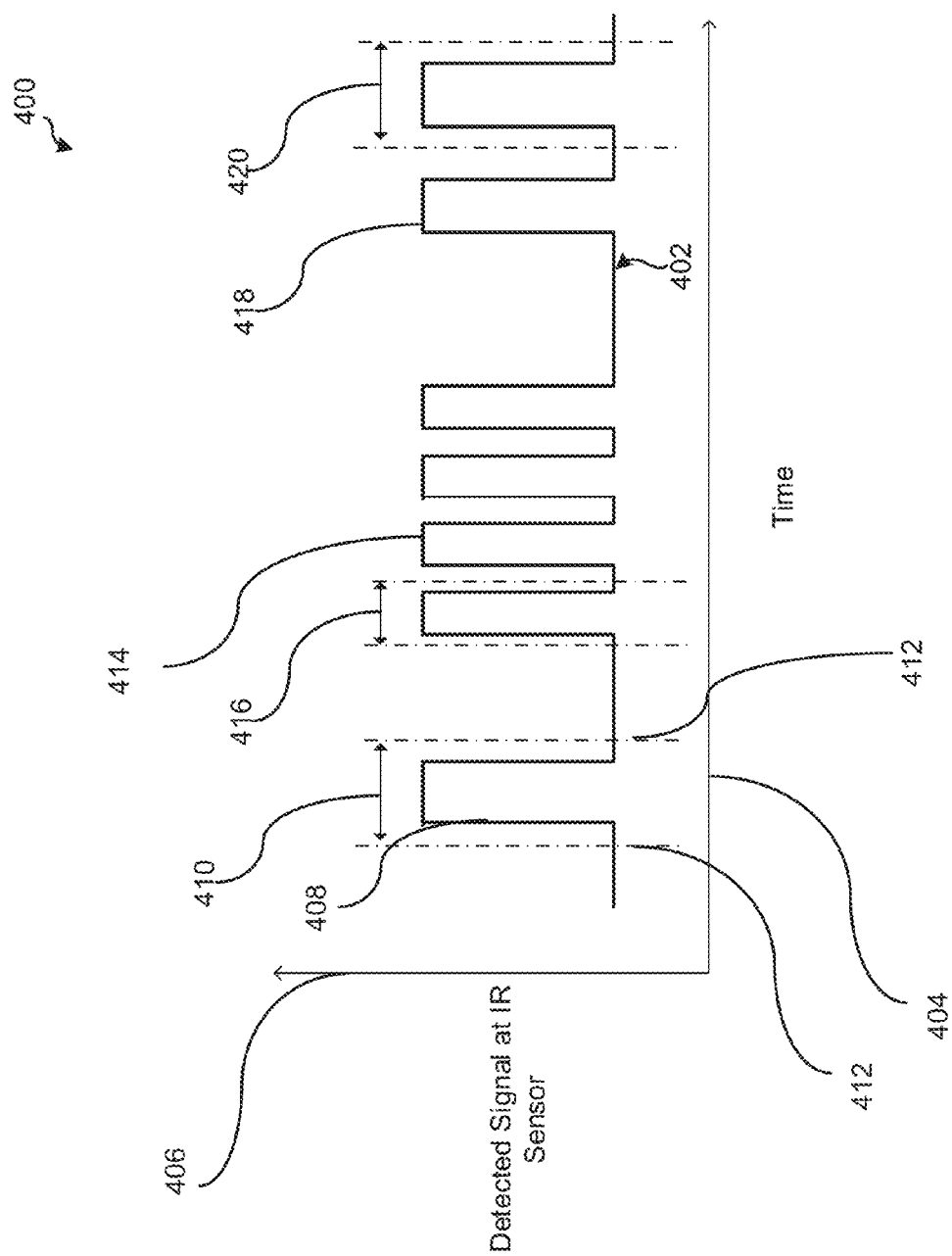
FIG. 4 is graph representative of an example signal, which defines an example input sequence, provided by an infrared proximity sensor of the example device of FIG. 2.

FIG. 4 is graph 400 representative of an example signal 402, which defines an example input sequence, provided by an infrared proximity sensor (e.g., the infrared proximity sensor 212 of FIGS. 2 and 3) of the example device 200 of FIG. 2. A horizontal axis 404 represents time. A vertical axis 406 represents output (e.g., an output signal) or voltage provided by the infrared proximity sensor based on detections or inputs. In this example, a first portion (e.g., a pulse, an input pulse, a detection pulse, an input, a pulse based on input, etc.) 408 of the signal 402 is provided by the infrared proximity sensor. In this example, the first portion 408 has a corresponding tolerance range 410 with corresponding ends 412. A second portion of pulses 414 of the example signal 402 includes multiple inputs or detections (e.g., four detection events) is later provided. In this example, the second portion 414 of the signal 402 has a corresponding tolerance range 416 for each pulse of the second portion 414.

A third portion 418 of the signal 402 is later provided after a time period following the second portion 414. Likewise, the third portion 418 has a corresponding tolerance range 420 for each pulse of the third portion 418. In this example, the first portion 408, the second portion 414 and the third portion 418 define the input sequence. While the first portion 408, the second portion 414, and the third portion 418 are depicted as rectangular functions, they may vary from a rectangular shape and/or be processed by circuitry to have the rectangular shape.

In this example, the tolerance ranges 410, 416, and 420 are used in the determination and/or verification, by a processor, of the input sequence received (e.g., detected) from the infrared proximity sensor and/or defined by the processor based on pulses (e.g., detections). In other words, verification of the input sequence is based on whether the pulses are received within their respective tolerance bands, for example. In this example, pulses of the first portion 408, the second portion 414 and the third portion 418 match a sequence and/or fall within the corresponding tolerance bands to cause the processor to interpret the input sequence as a command to perform an action, for example.

In some examples, the tolerance range widths vary at different time periods of the signal 402. Additionally or alternatively, the input sequence may require inputs or detections at defined durations (e.g., some inputs are verified to be longer than others to verify a received input sequence). In some examples, verification or determination of the input sequence is also based on not receiving detection pulses at certain times. For example, determination of the lack of pulses (e.g., non-detection or low voltage levels measured at an infrared proximity sensor) between the first portion 408 and the second portion 414, and/or the lack of inputs between the second portion 414 and the third portion 418 may be used in verification of the input sequence. Likewise, in some examples, periods of expected non-detection may have corresponding tolerance bands as well. In other examples, the input sequence may be verified by the processor if inputs are out of the tolerance bands (e.g., the inputs extend beyond respective tolerance bands instead of falling within the tolerance bands). In such examples, the input sequence may still be verified if a pulse extends beyond one or more sides of a tolerance band within a defined error. Additionally or alternatively, an input sequence may not be verified if a greater number of pulses than expected is received within a tolerance band (e.g., two distinct pulses within a defined time tolerance band).

Figure 5:
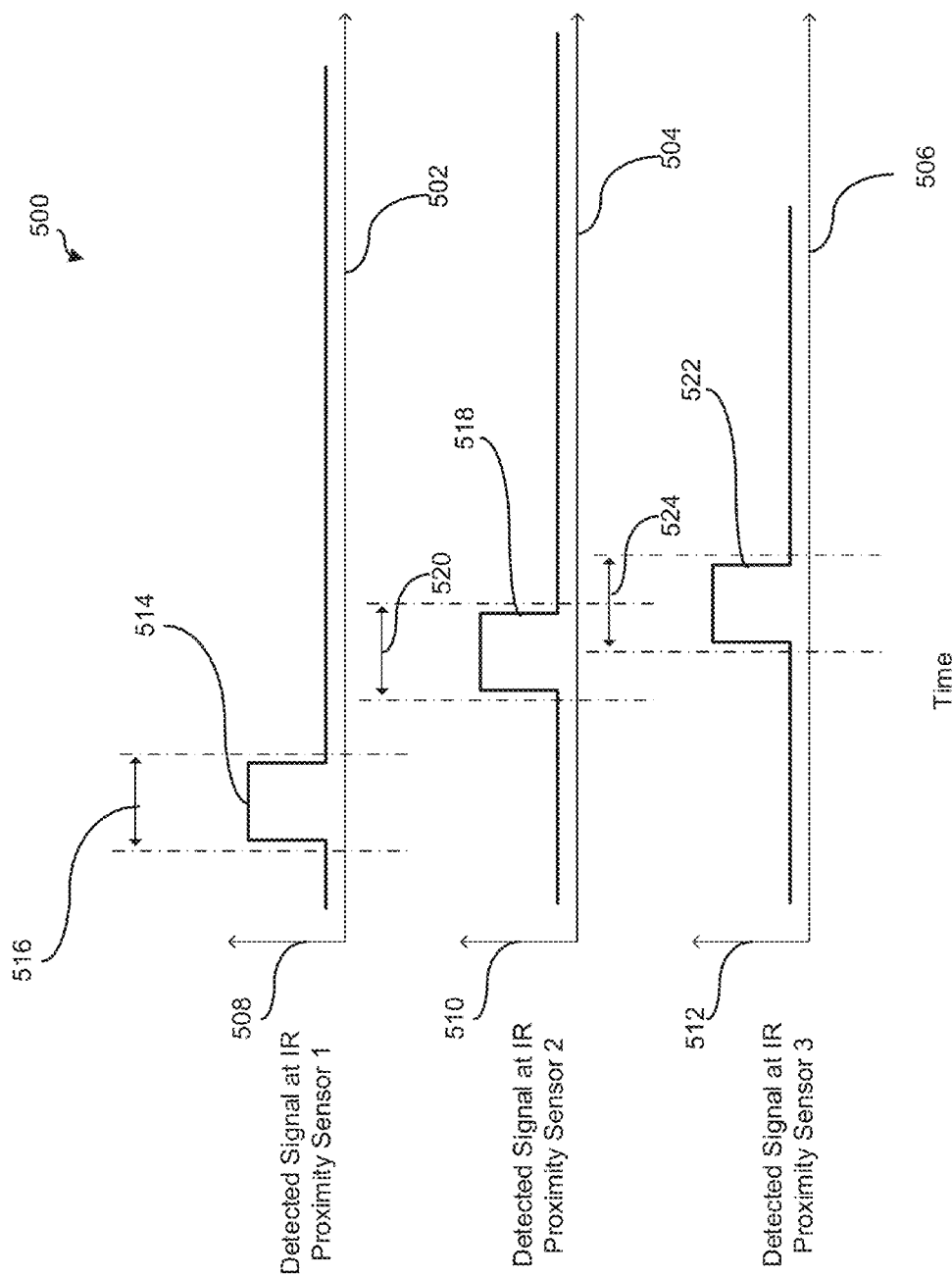
FIG. 5 is a graph representative of example signals, which define another example input sequence, provided by a plurality of infrared proximity sensors of the example device of FIG. 2.

FIG. 5 is another graph 500 representative of example signals, which define another example input sequence, provided by a plurality of infrared proximity sensors (e.g., the infrared proximity sensors 212 of FIGS. 2 and 3) of the example device 200 described above in connection with FIG. 2. In this example, the axes 502, 504 and 506 represent time axes. A vertical axis 508 of the illustrated example represents output (e.g., an output signal) of a first infrared proximity sensor. Likewise, the vertical axes 510 and 512 represent output of the second and third infrared proximity sensors, respectively. In this example, a first pulse (e.g., an input pulse, a detection pulse, an input, a pulse based on input, etc.) 514 is provided by the first infrared proximity sensor. The first pulse 514 of the illustrated example has a corresponding tolerance band 516 (e.g., an error band in which a detection pulse is to be provided by the first infrared proximity sensor). Similarly, the second infrared proximity sensor provides a second pulse 518, which has a corresponding tolerance band 520, at a later time than the first pulse 514. In this example, as the second pulse 518 is provided, a third pulse 522 is provided by the third infrared proximity sensor and has a corresponding tolerance band 524. In other words, the third pulse 522 overlaps in time with the second pulse 518. Similar to the example described in connection with FIG. 4, the first pulse 514, the second pulse 518 and the third pulse 522 match a sequence and/or fall within corresponding tolerance bands to cause a processor to interpret the input sequence as a command to perform an action, for example. In this example, the overlap of the second pulse 518 and the third pulse 522 is a portion of the input sequence. While the first pulse 514, the second pulse 518, and the third pulse 522 are depicted as rectangular functions, they may vary from a rectangular shape and/or be processed by circuitry to have the rectangular shape.

In other examples, the processor may interpret and/or verify the input sequence based on one or more pulses being extending beyond a range of a tolerance band and/or the processor may still interpret a command if one or more pulses extend beyond the tolerance bands within an allowed range beyond the respective tolerance bands. In yet other examples, durations (e.g., widths) of the tolerance bands 516, 520 and 524 may vary with respect to one another and/or vary over time (e.g., one or more widths of the tolerance bands 516, 520 and 524 vary over time).

Figure 6:
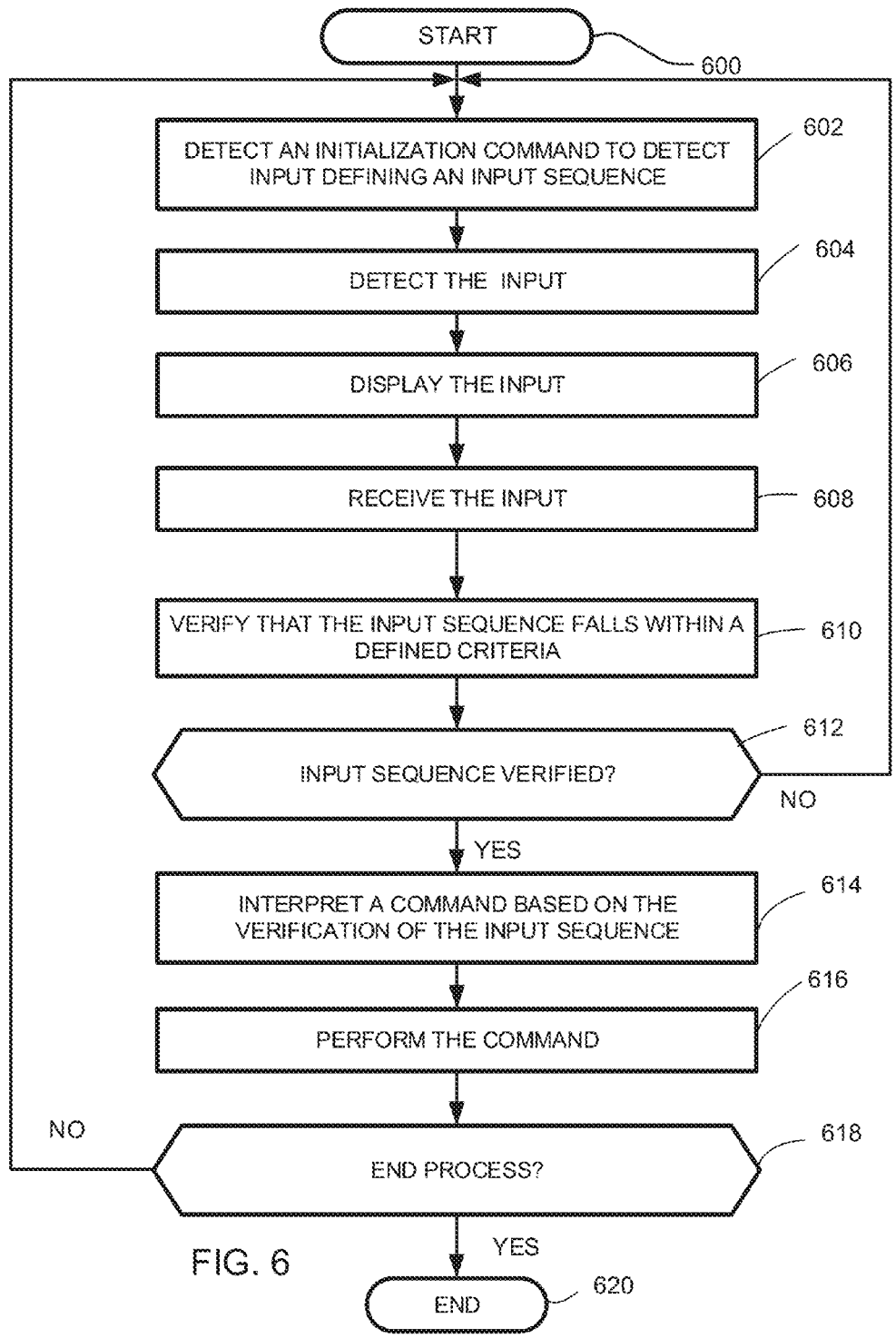
FIG. 6 is a flowchart representative of an example method that may be used to implement the example device of FIG. 2.

A flowchart representative of an example method for implementing the example device 200 of FIG. 2 is shown in FIG. 6. In these examples, the methods may be implemented using machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example device 200 may alternatively be used. For example, the order of execution of the blocks may be changed, and/or some of the blocks described may be changed, eliminated, or combined.

As mentioned above, the example method of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of an example method that may be used to implement the example device 200 of FIG. 2. The example method of FIG. 6 may begin operation at block 600 when a portable device, which has an infrared proximity sensor disposed within a substantially environmentally-isolated enclosure (e.g., housing) of the device, is being used to communicate to an endpoint of a utility data communication system (e.g., the utility data communication system 100 of FIG. 1) (block 600). Next, an initialization command is detected by a portable device at the infrared proximity sensor of the device, for example (block 602). In this example, the initialization command enables and/or initializes the portable device to receive input and/or an input sequence via one or more infrared proximity sensors (e.g., the infrared proximity sensors 212 of the device 200) by programming a processor of the portable device to receive the input and/or the input sequence. The initialization command may be similar to the input sequences of the example graph 400 or the example graph 500 described above in connection with FIGS. 4 and 5, respectively. In some examples, the initialization command is communicated to the device via wireless means (e.g., Bluetooth, Wi-Fi, etc.). Additionally or alternatively, the initialization command defines what input and/or input sequences the device is initialized and/or enabled to receive (e.g., defines what input sequences the device may interpret or receive, etc.). The input is then detected at the infrared proximity sensor (block 604). In some examples, the input is displayed on a display (e.g., the detection indicators 224 of the display 208) and/or an LED disposed on or within an enclosure of the device (block 606).

In this example, the processor (e.g., the processor 712 of FIG. 7) of the device receives the input, signals resulting from the input, and/or the input sequence (block 608). The processor of the illustrated example then verifies that the input sequence falls within a defined criteria (block 610). For example, the processor may verify that a pulse of the inputs or signals of the input sequence falls within respective time tolerance bands and/or ends of the pulse are within a defined error of the respective tolerance bands (e.g., the pulse may be within or extend out of the time tolerance band within the defined error). In particular, the processor may verify or compare a received input sequence such as the input sequences described above in connection with the graphs 400 and 500 described above with defined inputs and/or predefined sequences to interpret a command (e.g., the processor is programmed to interpret the command). While comparison of the input sequence to time tolerance bands is described in this example, any verification methodology may be used to compare the input sequence to defined sequences.

If the sequence is not successfully verified (block 612) by the processor, the process repeats (block 602). If the sequence is successfully verified by the processor, the processor interprets a command (block 614). In some examples, the processor may perform the command (block 616). In particular, performance of the command by the processor may involve enabling and/or initializing the endpoint to communicate with another device (e.g., the mobile phone 110, the tablet 112 and/or the laptop 114, etc.). The processor of the illustrated example may also perform, based on the verification of the input sequence, an internal command related to the device such as turning the device on or off, initializing the device, or issuing a command, etc. After the command has been performed, it is determined whether the process is to end (block 618). If the process is not determined to end (block 618), the process repeats (block 602). Otherwise, if the process is determined to end (block 618), the process ends (block 620). In some examples, a determination of whether the process is to end may be based on the type of command performed and/or a time delay after an input sequence is received (e.g., a timeout).

Figure 7:
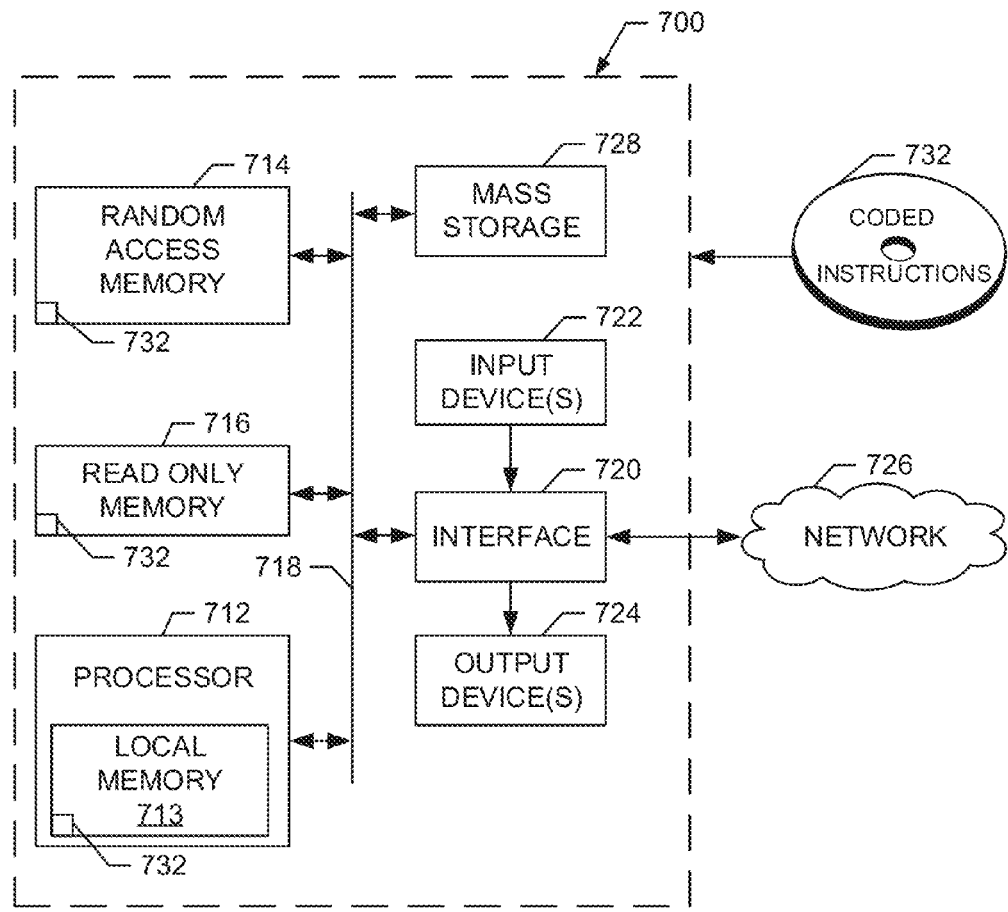
FIG. 7 is a block diagram of an example processor platform capable of executing machine readable instructions to implement the example method of FIG. 6.

FIG. 7 is a block diagram of an example processor platform 700 capable of executing instructions to implement the method of FIG. 6 to implement the example control device 200 of FIG. 2. The processor platform 700 can be, for example, a server, a personal computer, a mobile device (e.g., a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory including the volatile memory 714 and the non-volatile memory 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the method of FIG. 6 may be stored in the mass storage device 728, in the local memory 713, in the volatile memory 714, in the non-volatile memory 716, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While utility communication devices are described, the example methods and apparatus may be applied to electronic devices, portable electronic devices, non-portable devices, etc.

What is claimed is:
1. An apparatus comprising:
a first infrared proximity detection sensor disposed within a substantially environmentally-isolated zone of a portable electronic device, the first infrared proximity detection sensor to detect a first portion of an input sequence;

a second infrared proximity detection sensor disposed within the environmentally-isolated zone, the second infrared proximity detection sensor to detect a second portion of the input sequence;

a translucent window at least partially defining the substantially environmentally-isolated zone, wherein the first and second infrared proximity detection sensors are oriented substantially perpendicularly relative to the translucent window;

a circuit board within the environmentally-isolated zone, wherein the first and second infrared proximity detection sensors are mounted onto the circuit board; and a processor coupled to the first and second infrared proximity detection sensors, the processor programmed to combine the first and second portions of the input sequence to define the input sequence, the processor to interpret a command by comparing a defined sequence to the input sequence.

2. The apparatus as defined in claim 1, wherein the defined sequence comprises overlapping detections from both the first and second infrared proximity detection sensors.

3. The apparatus as defined in claim 1, wherein the processor is programmed to receive the input sequence from the first and second infrared proximity detection sensors based on the processor receiving an initialization command from one or more of the first and second infrared proximity detection sensors.

4. The apparatus as defined in claim 1, wherein the substantially environmentally-isolated zone overlaps with at least a portion of a drop-damage resistant zone.

5. The apparatus as defined in claim 1, wherein the electronic device is a first electronic device, and wherein the command comprises enabling communication between the first electronic device and a second electronic device.

6. The apparatus as defined in claim 1, wherein the translucent window is sealed to a housing via a gasket at a peripheral edge of the translucent window.

7. The apparatus as defined in claim 1, wherein the first and second infrared proximity detection sensors detect respective finger proximity sequences, wherein the input sequence is based on combining the respective finger proximity sequences.

8. The apparatus as defined in claim 7, wherein the first portion of the input sequence includes a first finger proximity sequence detected at the first infrared proximity detection sensor, and wherein the second portion of the input sequence includes a second finger proximity sequence detected at the second infrared proximity detection sensor.

9. A method comprising:
detecting, by first and second infrared proximity detection sensors of a plurality of infrared proximity detection sensors disposed within a substantially environmentally-isolated zone of a portable device, a first portion of an input sequence at the first infrared proximity detection sensor and a second portion of the input sequence at the second infrared proximity detection sensor, the first and second infrared proximity detection sensors mounted onto a circuit board disposed within the environmentally-isolated zone, the first and second portions detected via a translucent window at least partially defining the substantially environmentally-isolated zone;

combining, by a processor, the first and second portions of the input sequence to define the input sequence;

verifying, at the processor, that the input sequence falls within a defined criteria; and interpreting a command, at the processor, based on the verification of the input sequence.

10. The method as defined in claim 9, further comprising programming the processor to receive the input sequence by receiving, at the processor, an initialization command comprising input detected at one or more of the plurality of infrared proximity detection sensors.

11. The method as defined in claim 9, wherein the defined criteria comprises an expected input sequence with respective time error tolerance bands.

12. The method as defined in claim 9, wherein the defined criteria comprises expected overlapping detections at two or more of the plurality of infrared proximity detection sensors.

13. The method as defined in claim 9, wherein the command comprises turning the portable device on or off.

14. The method as defined in claim 9, wherein the portable device comprises a first device, and wherein the command comprises enabling communication between a second device and a utility endpoint.

15. The method as defined in claim 9, wherein the processor is disposed within the substantially environmentally-isolated zone.

16. An apparatus comprising:
a first infrared proximity detection sensor disposed within a substantially environmentally-isolated zone of a portable electronic device for use with utility communication systems, the first infrared proximity detection sensor to detect a first at least one finger tap defining a first portion of an input sequence;

a second infrared proximity detection sensor disposed within the substantially environmentally-isolated zone, the second infrared proximity detection sensor to detect a second at least one finger tap defining a second portion of the input sequence;

a circuit board to which the first and second infrared proximity detection sensors are mounted;

a translucent window at least partially defining the substantially environmentally-isolated zone, wherein at least one of the first and second infrared proximity detection sensors is oriented substantially perpendicularly relative to the translucent window; and a processor disposed within the substantially environmentally-isolated zone, the processor to perform an action upon combining the first and second portions of the input sequence to define the input sequence and comparing the input sequence to a defined sequence.

17. The apparatus as defined in claim 16, wherein the defined sequence comprises an expected input sequence with respective time error tolerance bands.

18. The apparatus as defined in claim 17, wherein comparing the input sequence comprises verifying a number of detection pulses within a respective time tolerance band.

19. The apparatus as defined in claim 16, wherein the defined sequence comprises overlapping detections at the first and second infrared proximity detection sensors.

20. The apparatus as defined in claim 16, further comprising displaying the detected input on a display, wherein the display is disposed within the substantially environmentally-isolated zone.

21. The apparatus as defined in claim 16, wherein the portable electronic device is a first electronic device, and wherein the action comprises enabling communication between a utility endpoint and a second electronic device.

22. The apparatus as defined in claim 16, wherein the translucent window is a first translucent window proximate the first infrared proximity detection sensor, and further comprising a second translucent window at least partially defining the substantially environmentally-isolated zone, the second translucent window proximate the second infrared proximity detection sensor.

23. The apparatus as defined in claim 22, wherein the input sequence is a sequence of finger taps proximate the first and second translucent windows that are provided by a user.

\* \* \* \* \*